United States Patent
Kim

(10) Patent No.: US 8,441,542 B2
(45) Date of Patent: May 14, 2013

(54) SELF-TIMER PHOTOGRAPHING APPARATUS AND METHOD INVOLVING CHECKING THE NUMBER OF PERSONS

(75) Inventor: Eun-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 12/512,167

(22) Filed: Jul. 30, 2009

(65) Prior Publication Data

US 2010/0026830 A1 Feb. 4, 2010

(30) Foreign Application Priority Data

Jul. 31, 2008 (KR) .................. 10-2008-0075332

(51) Int. Cl.
 *H04N 5/228* (2006.01)

(52) U.S. Cl.
 USPC .................................. 348/222.1; 348/208.14

(58) Field of Classification Search ............. 348/208.14, 348/211.99, 222.1

See application file for complete search history.

(56) References Cited

U.S. PATENT DOCUMENTS

| | | | |
|---|---|---|---|
| 8,004,573 B2 * | 8/2011 | Watanabe | 348/211.99 |
| 2006/0197845 A1 * | 9/2006 | Masaki | 348/224.1 |
| 2007/0274703 A1 * | 11/2007 | Matsuda | 396/264 |
| 2008/0025710 A1 * | 1/2008 | Sugimoto | 348/207.99 |
| 2009/0027513 A1 * | 1/2009 | Sako | 348/222.1 |

FOREIGN PATENT DOCUMENTS

JP 2004-336265 A 11/2004

* cited by examiner

*Primary Examiner* — Gevell Selby
(74) *Attorney, Agent, or Firm* — Drinker Biddle & Reath LLP

(57) ABSTRACT

Provided is a digital photographing apparatus and method, and more particularly, provided is a self-timer photographing apparatus and method involving checking the number of persons using an image capturing device having a self-timer function. The self-timer photographing apparatus involving checking the number of persons as a digital image processing device, the apparatus includes a digital signal processing unit detecting a change in the number of faces of a live view image, detecting positions of faces of the live view image, and, when there is no change in the positions of faces during a predetermined period of time, controlling to perform self-timer photographing.

6 Claims, 6 Drawing Sheets

(a)    (a-1)    (a-2)

(b)    (b-1)    (b-2)

(c)    (c-1)    (c-2)

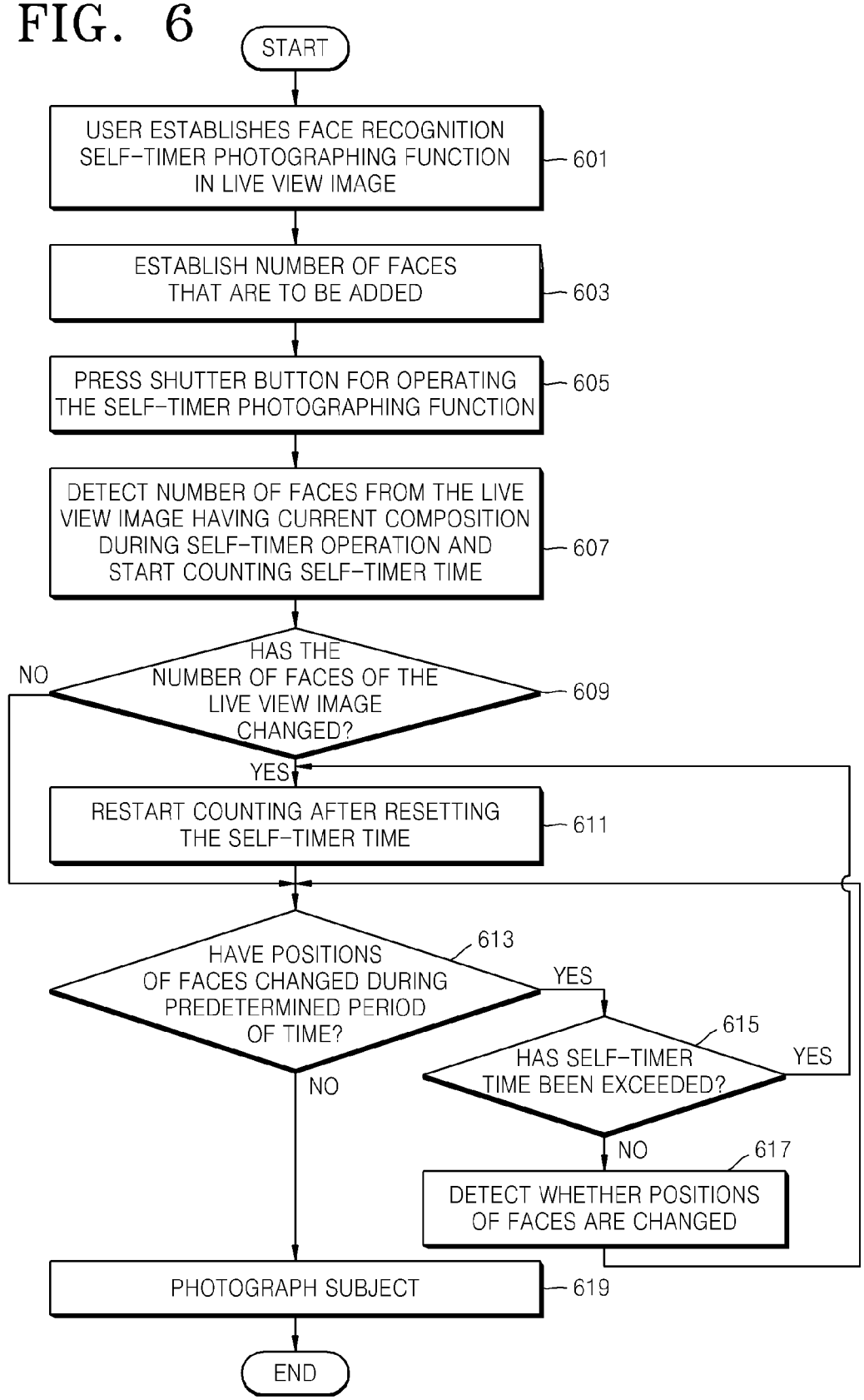

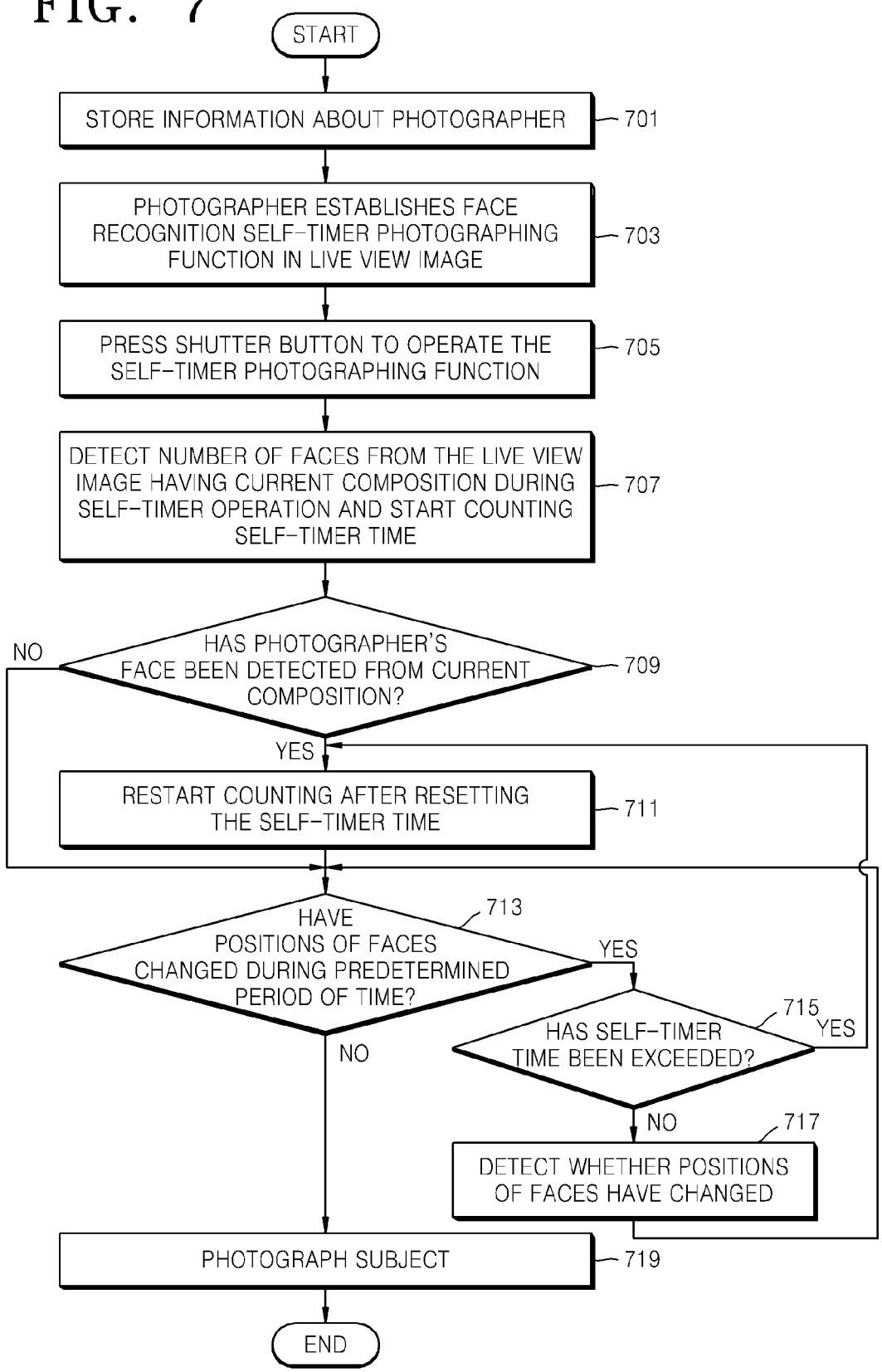

SELF-TIMER PHOTOGRAPHING APPARATUS AND METHOD INVOLVING CHECKING THE NUMBER OF PERSONS

CROSS-REFERENCE TO RELATED PATENT APPLICATION

This application claims the benefit of Korean Patent Application No. 10-2008-0075332, filed on Jul. 31, 2008, in the Korean Intellectual Property Office, the disclosure of which is incorporated herein in its entirety by reference.

BACKGROUND OF THE INVENTION

1. Field of the Invention

The present invention relates to a digital photographing apparatus and method, and more particularly, to a self-timer photographing apparatus and method involving checking the number of persons using an image capturing device having a self-timer function.

2. Description of the Related Art

Digital image processing devices generally capture a subject through a charge coupled device (CCD) and store the captured subject in a memory. Such digital image processing devices may photograph and store the subject at any time at any places, and display and delete the photographed and stored image.

Such digital image processing devices have a self-timer photographing function. In this regard, the self-timer is a function of delaying time between when a shutter-release button of digital image processing devices is pressed and when a shutter is opened. For example, if the shutter-release button is pressed after the self-timer is adjusted to 10 seconds, a subject is photographed by way of shutter-release 10 seconds after the shutter-release button is pressed.

The self-timer function is used to prevent an image from being shaken or to photograph a user as a subject.

A photographing method using the self-timer function involves the selecting of a self-timer menu from a plurality of menus of a digital image processing device, the selecting of a delay time (for example, 5 seconds or 10 seconds), the adjusting of the digital image processing device to a subject, and the pressing of a shutter-release button so that the subject is photographed after the selected time elapses.

Digital image processing devices can perform the self-timer function by the shutter-release button being pressed after adjusting the self-timer function. Also, since time is fixed to perform self-timer photographing, it is impossible to obtain a desired image when a user moves or changes his/her pose after initiation of the self-timer photographing.

SUMMARY OF THE INVENTION

The present invention provides a self-timer photographing apparatus and method involving checking the number of persons if the number of persons is changed when self-timer photographing is performed by using a face recognition function.

According to an aspect of the present invention, there is provided a self-timer photographing apparatus involving checking the number of persons as a digital image processing device, the apparatus comprising: a digital signal processing unit detecting a change in the number of faces of a live view image, detecting positions of faces of the live view image, and, when there is no change in the positions of faces during a predetermined period of time, controlling to perform self-timer photographing.

The digital signal processing unit may reset a self-timer photographing time and restarts counting the self-timer photographing time if a change in the number of faces is detected.

The digital signal processing unit may comprise: a face recognition unit detecting the number and positions of faces from the live view image in a self-timer photographing mode; a position detecting unit detecting a change in the detected positions of faces; and a controller, if the number of faces of the live view image has changed, and the positions of faces of the changed live view image have not changed during a predetermined period of time, controlling the live view image to be self-timer photographed.

According to another aspect of the present invention, there is provided a self-timer photographing apparatus involving checking the number of persons as a digital image processing device, the apparatus comprising: a digital signal processing unit, after a number of faces that are to be added is established, detecting the established number of added faces of a live view image, detecting positions of faces of the changed live view image including added faces, and, when there is no change in the positions of faces during a predetermined period of time, controlling to perform self-timer photographing.

The digital signal processing unit may reset a self-timer photographing time and restarts counting the self-timer photographing time if the established number of added faces is detected.

The digital signal processing unit may comprise: a face recognition unit detecting the number and positions of faces from the live view image in a self-timer photographing mode; a position detecting unit detecting a change in the detected positions of faces; and a controller receiving a signal establishing the number of faces that are to be added, and if the established number of added faces is detected, and if the positions of faces of the changed live view image have not changed during a predetermined period of time, controlling the live view image to be self-timer photographed.

According to another aspect of the present invention, there is provided a self-timer photographing apparatus involving checking the number of persons as a digital image processing device, the apparatus comprising: a digital signal processing unit obtaining information about a photographer, if a photographer's face is detected from a live view image, detecting positions of faces of the changed live view image including the photographer's face, and, when there is no change in the positions of faces during a predetermined period of time, controlling to perform self-timer photographing.

The digital signal processing unit may reset a self-timer photographing time and restarts counting the self-timer photographing time if the photographer's face is detected.

The digital signal processing unit may comprise: a photographer information obtaining unit detecting the information about the photographer; a face recognition unit detecting the number and positions of faces from the live view image in a self-timer photographing mode; a position detecting unit detecting a change in the detected positions of faces; and a controller detecting the photographer's face from the live view image, and if there is no change in the positions of faces of the changed live view image including the photographer's face during a predetermined period of time, controlling the live view image to be self-timer photographed.

According to another aspect of the present invention, there is provided a self-timer photographing method involving checking the number of persons, the method comprising: detecting a change in the number of faces of a live view image; detecting whether there is a change in positions of faces in the live view image in which there has been a change in the number of faces during a predetermined period of time;

when there is no change in the positions of faces during the predetermined period of time, controlling to perform self-timer photographing.

The detecting of the change in the number of faces, if a change in the number of faces is detected, may comprise resetting self-timer photographing time and restarting counting the self-timer photographing time.

The controlling of the performing of self-timer photographing, after the change in the number of faces is detected, if the predetermined period of time for detecting the change in the number of faces exceeds the self-timer photographing time, may comprise resetting the self-timer photographing time and restarting counting the self-timer photographing time.

According to another aspect of the present invention, there is provided a self-timer photographing method involving checking the number of persons comprising: receiving a signal for establishing the number of faces that are to be added; detecting a change in the established number of added faces of a live view image; detecting whether there is a change in the positions of faces of the changed live view image during a predetermined period of time; and if there is no change in the positions of faces of the live view image in which there has been a change in the number of faces during the predetermined period of time, controlling to perform self-timer photographing.

The detecting of the change in the established number of added faces, if the established number of added faces is detected, may comprise resetting self-timer photographing time and restarting counting the self-timer photographing time.

The controlling of the performing of self-timer photographing, after the change in the positions of faces is detected, if the predetermined period of time for detecting the change in the positions of faces exceeds the self-timer photographing time, may comprise resetting the self-timer photographing time and restarting counting the self-timer photographing time.

According to another aspect of the present invention, there is provided a self-timer photographing method involving checking the number of persons comprising: obtaining information about a photographer; detecting a change in a live view image including a photographer's face; detecting whether there is a change in positions of faces of the live view image including the photographer's face; and if there is no change in the positions of faces during a predetermined period of time, controlling to perform self-timer photographing.

The detecting of the change in the live view, if the photographer's face is detected, may comprise resetting self-timer photographing time and restarting counting the self-timer photographing time.

The controlling of to perform self-timer photographing, after the change in the positions of faces is detected, if the predetermined period of time for detecting the change in the positions of faces exceeds the self-timer photographing time, may comprise resetting the self-timer photographing time and restarting counting the self-timer photographing time.

BRIEF DESCRIPTION OF THE DRAWINGS

The above and other features and advantages of the present invention will become more apparent by describing in detail embodiments thereof with reference to the attached drawings in which:

FIG. 6 is a flowchart illustrating a self-timer photographing method involving checking the number of persons according to another embodiment of the present invention; and FIG. 7 is a flowchart illustrating a self-timer photographing method involving checking the number of persons according to another embodiment of the present invention.

DETAILED DESCRIPTION OF THE INVENTION

Hereinafter, embodiments of the present invention will be described in detail with reference to the accompanying drawings.

Figure 1:
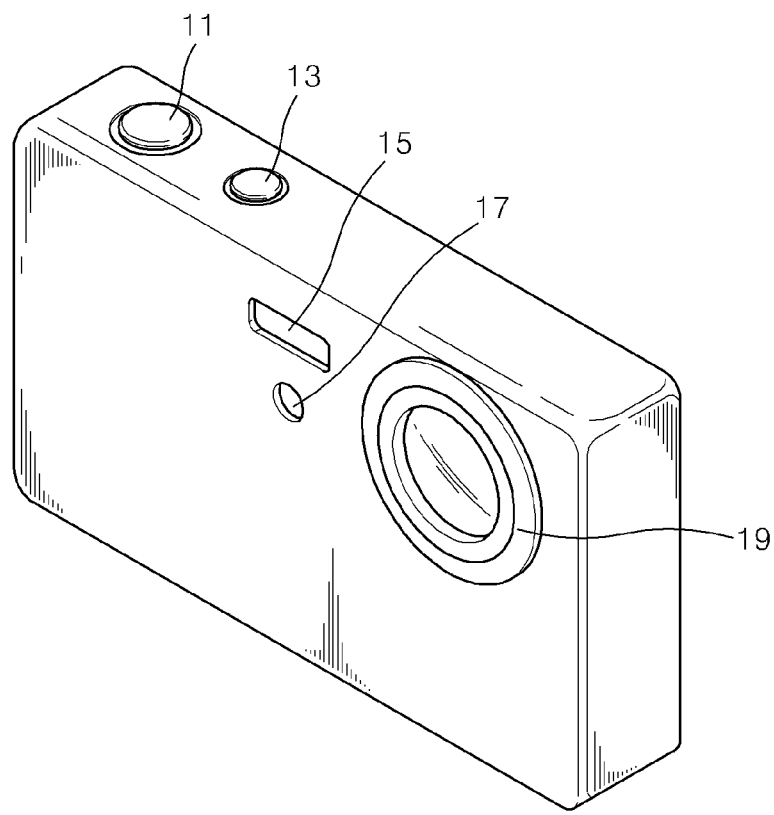
FIG. 1 is a perspective view of a digital image processing device.

FIG. 1 is a perspective view of a digital image processing device according to an embodiment of the present invention.

The shutter-release button 11 is used to open and close a shutter in order to expose a charge coupled device (CCD) or a film to light for a predetermined amount of time and records an image in the CCD by appropriately exposing an object in cooperation with an aperture (not shown).

The shutter-release button 11 generates a first photographing signal and a second photographing signal according to a user input. Upon a first manipulation of the shutter-release button 11 into a half-depressed state to generate the first photographing signal, the digital image processing device adjusts a focus and the amount of light for exposure. When the digital image processing device is in focus, a green light is turned on in a display unit. After the digital image processing device finishes focusing and adjusting the amount of light in response to first manipulation of the shutter-release button 11, the shutter-release button 11 is manipulated a second time into a fully-depressed state so as to input the second photographing signal for photographing.

The power button 13 is manipulated in order to operate the digital image processing device by supplying power to the digital image processing device.

The flash 15 momentarily emits bright light to an object for photographing in a dark environment. The flash 15 has flash modes such as auto flash, fill flash, flash off, red-eye reduction, slow sync, and the like.

The sub light 17 provides light to an object in order to allow the digital image processing device to quickly and accurately adjust a focus in an automatic manner in insufficient light or night photographing conditions.

The lens unit 19 receives light from an external light source and processes an image.

Figure 2:
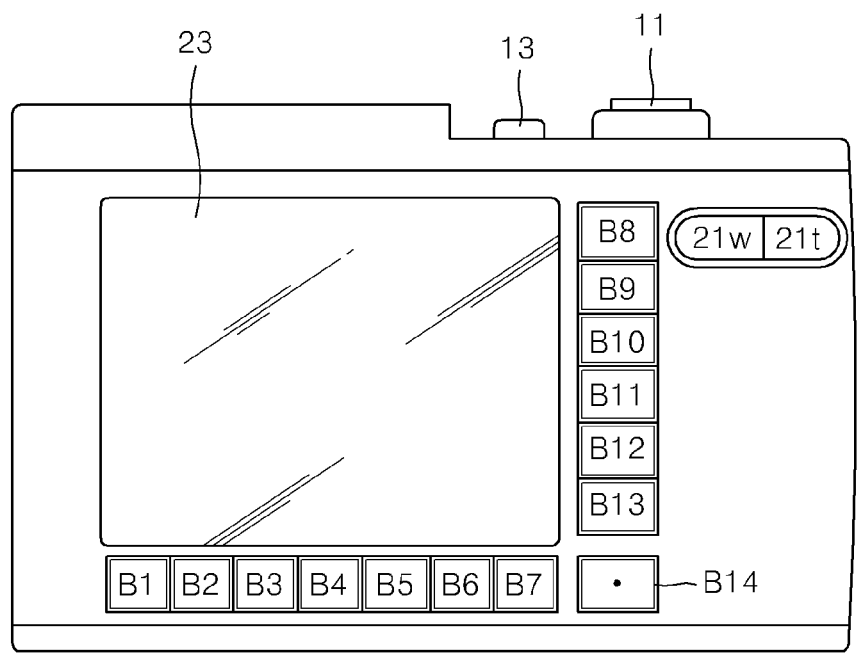
FIG. 2 is a back view of the digital image processing device illustrated in FIG. 2.

FIG. 2 is a back view of the digital image processing device illustrated in FIG. 1. Referring to FIG. 2, the digital image processing device includes a wide-angle zoom button 21w, a telephoto zoom button 21t, a display unit 23, and input buttons B1 through B14 having touch sensors or contact switches.

When the wide-angle zoom button 21w or the telephoto zoom button 21t is manipulated, the angle of view becomes wider or narrower. In particular, the wide-angle zoom button 21w or the telephoto zoom button 21t is manipulated in order to change the size of a selected exposure region. The size of the selected exposure region is increased upon manipulation of the wide-angle zoom button 21w, and the size of the selected exposure region decreases upon input of the telephoto zoom button 21t.

The input buttons B1 through B14 are provided in a horizontal line and a vertical line of the display unit 23. The input buttons B1 through B14 have touch sensors (not shown) or contact switches (not shown).

In other words, when the input buttons B1 through B14 have touch sensors, the user can select an arbitrary value, e.g., color or brightness, from a main menu item or can activate a sub menu icon included in a main menu icon, by moving up/down/left/right while touching the buttons B1 through B7 in the horizontal line or the buttons B8 through B14 in the vertical line, i.e. may be "slide" operated.

When the input buttons B1 through B14 have contact switches, the user can execute a desired function by directly selecting a particular main menu icon and a sub menu icon or the like. A touch sensor is more sensitive than a contact switch, and thus the contact switch requires a strong touch compared to the touch sensor.

Figure 3:
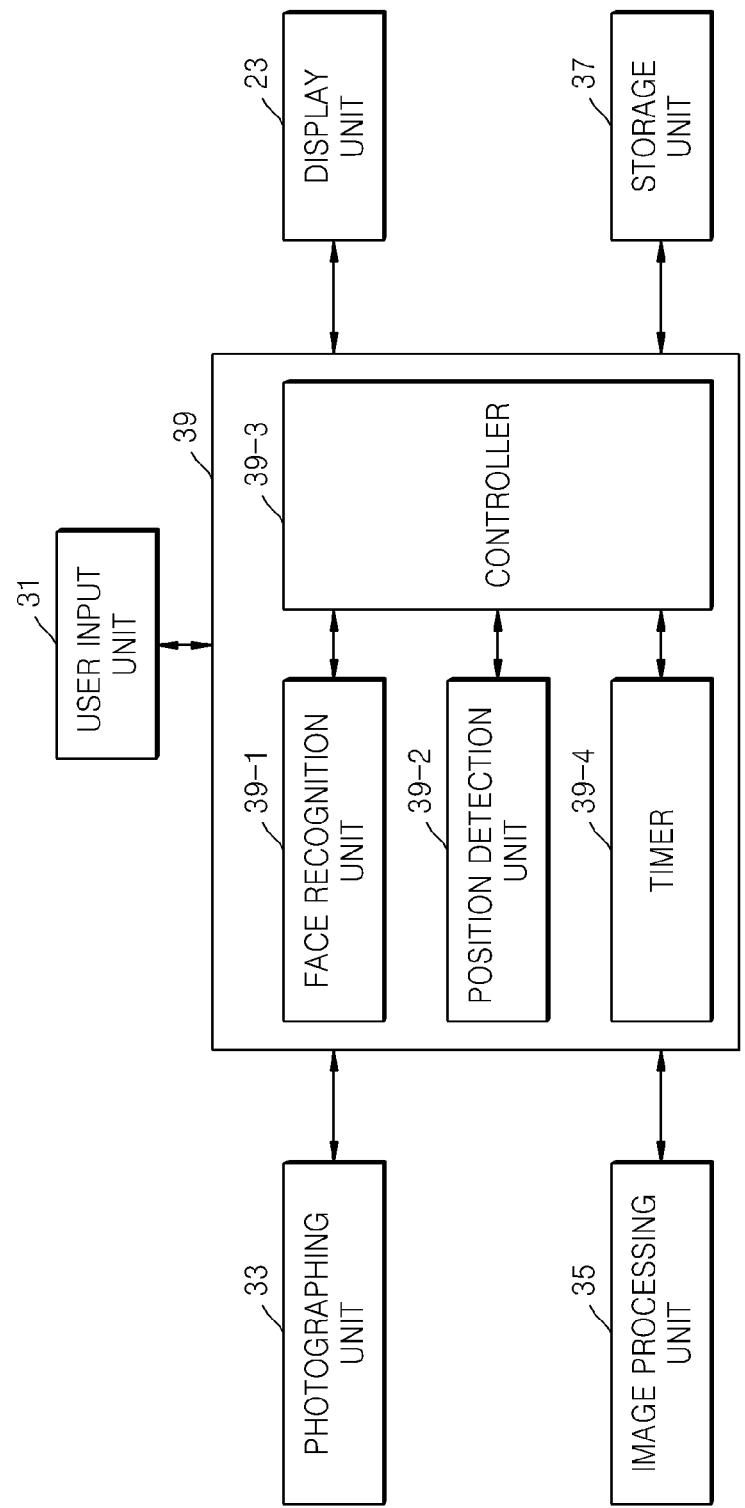
FIG. 3 is a block diagram of a self-timer photographing apparatus according to an embodiment of the present invention.

FIG. 3 is a block diagram of a self-timer photographing apparatus according to an embodiment of the present invention. Referring to FIG. 3, the self-timer photographing apparatus includes the display unit 23, a user input unit 31, a photographing unit 33, an image processing unit 35, a storage unit 37, and a digital signal processing unit 39.

The user input unit 31 includes the shutter-release button 11 that is used to open or close a shutter in order to expose a CCD or a film to light for a predetermined amount of time, the power button 13 that is used to supply power, the wide-angle zoom button 21w and the telephoto zoom button 21t for increasing or reducing the angle of view, and the buttons B1 through B14 having touch sensors or contact switches and provided in a horizontal line and a vertical line of the display unit 23 so as to input text.

The photographing unit 33 includes a shutter, a lens unit, an aperture, a charge coupled device (CCD), and an analog-to-digital converter (ADC) that are not shown in the figures. The shutter is used to adjust the amount of light for light exposure in cooperation with the aperture. The lens unit receives light from an external light source and processes an image. The aperture adjusts the amount of incident light according to the amount of its opening/closing. The amount of opening/closing of the aperture is controlled by the digital signal processing unit 39.

The CCD accumulates the amount of light input through the lens unit and outputs an image captured through the lens unit in synchronization with a vertical sync signal according to the accumulated amount of light. The digital image processing device can obtain an image by means of the CCD that converts light from an object into an electric signal. A color filter is required to obtain a color image using the CCD. A color filter array (CFA) filter (not shown) is widely used. The CFA passes light of a single color for each pixel, has a regularly arranged structure, and can have various shapes according to an arrangement structure. The ADC converts an analog image signal output from the CCD into a digital image signal.

The image processing unit 35 performs signal processing to allow an image signal converted into digitally converted RAW data to be displayed. To this end, the image processing unit 35 removes a black level (noise) caused by dark current generated in the CCD and the CFA filter that are sensitive to a temperature variation. The image processing unit 35 performs gamma correction for encoding information so as to be appropriate for the nonlinearity of human vision. The image processing unit 35 performs color filter array (CFA) interpolation by interpolating a Bayer pattern implemented by RGRG lines and GBGB lines of gamma-corrected predetermined data into RGB lines. The image processing unit 35 converts the interpolated RGB signal into a YUV signal, performs edge compensation by filtering Y signals by using a high-pass filter and color correction by correcting color values of U and V signals by using a standard color coordinate system, and removes noise from the U and V signals. The image processing unit 35 then compresses and signal-processes the YUV signals from which noise has been removed, and generates a JPEG file. The generated JPEG file is displayed in the display unit 23 and is stored in the storage unit 37. The image processing unit 35 operates under the control of the digital signal processing unit 39.

The digital signal processing unit 39 checks the number of persons and controls self-timer photographing. In the present embodiment, the operation of the digital signal processing unit 39 that checks the number of persons and performs the self-timer photographing will now be described in three cases: (i) when the number of faces is changed, (ii) when the number of faces that are to be added is determined and the determined number of faces is detected, and (iii) when information about a photographer is obtained and a photographer's face is detected.

The digital signal processing unit 39 includes the face recognition unit 39-1, a position detection unit 39-2, a controller 39-3, and a timer 39-4.

The operation of the digital signal processing unit 39 will now be described when the number of faces is changed.

If the shutter-release button 11 is pressed so as to perform the self-timer photographing in a photographing mode, the digital signal processing unit 39 detects the change in the number of faces of a live view image, detects a change in positions of faces of the live view image, and, when there is no change in positions of faces for a predetermined period of time, controls to perform the self-timer photographing.

The face recognition unit 39-1 detects the number and position of faces from a live-view image displayed in the display unit 23. The face recognition unit 39-1 searches for characteristics (face elements such as eyes, nose, and mouth, texture, and skin color). In particular, the skin color is less sensitive to change due to movement, rotation, and size of a face and thus it is widely used. The face recognition unit 39-1 stores some standard patterns of a face to detect the face according to a face template based detection method. The face recognition unit 39-1 compares the stored standard patterns with each image within a search window and detects the face. A support vector machine (SVM) based face detection method, which has been recently used, sub-samples different areas of an image, makes a face and a non-face learned by using a learning unit, and discovers the face from an input image. Such a face detection method used by the face recognition unit 39-1 is well-known and thus the detailed description thereof is not given here in detail. The face recognition unit 39-1 detects face information such as the number and position of faces by using the face detection method.

The face recognition unit 39-1 sends a face number detection result to the controller 39-3 in real-time. The controller 39-3 compares the number of previous faces output by the face recognition unit 39-1 with the number of current faces and determines whether the number of faces has changed.

The position detection unit 39-2 detects whether positions of the detected faces are changed. If the position detection unit 39-2 receives a signal indicating that the number of faces has changed from the controller 39-3, the position detecting unit 39-2 determines whether the face position of a current live view image output by the face recognition unit 39-1 has changed during a predetermined period of time (for example, 2-3 seconds), and sends the determination result to the controller 39-3.

If the number of faces of the current live view image has changed, and positions of faces of the changed live view image have not changed during a predetermined period of time, the controller 39-3 controls the live view image to be self-timer photographed.

The timer 39-4 counts self-timer photographing time under the control of the controller 39-3. If the shutter-release button 11 is pressed so as to perform self-timer photographing, the controller 39-3 instructs the timer 39-4 to count the self-timer photographing time. If the change in the number of faces is detected, the controller 39-3 resets the timer 39-4 with regard to the self-timer photographing time, and outputs a signal instructing to recount the self-timer photographing time. After the change in the face position is detected, if a predetermined period of time for detecting the change in the face position exceeds the self-timer photographing time, the controller 39-3 resets the timer 39-4 with regard to the self-timer photographing time, and outputs a signal instructing to recount the self-timer photographing time.

Figure 4:
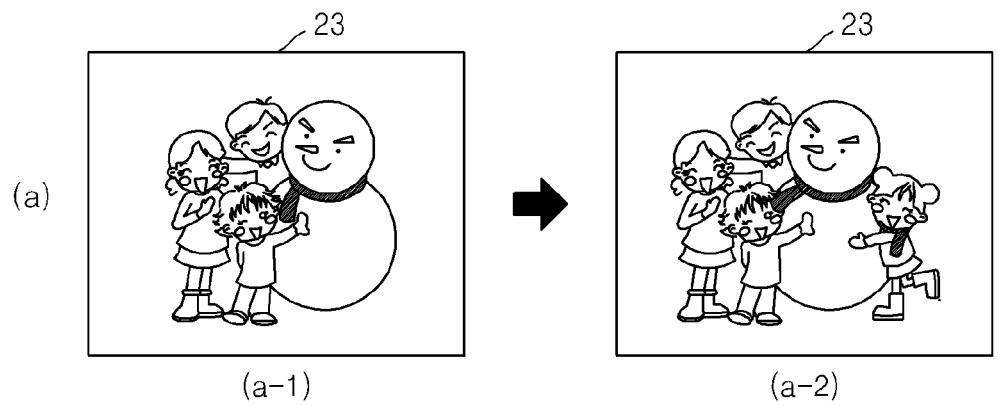
FIGS. 4A through 4C illustrate self-timer photographing involving checking the number of persons performed by the self-timer photographing apparatus shown in FIG. 3 according to an embodiment of the present invention.
Figure 4:
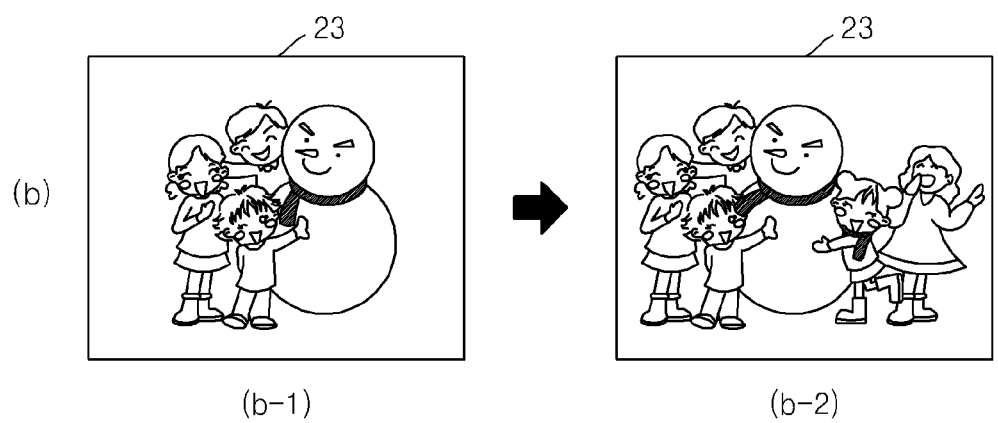
Figure 4:
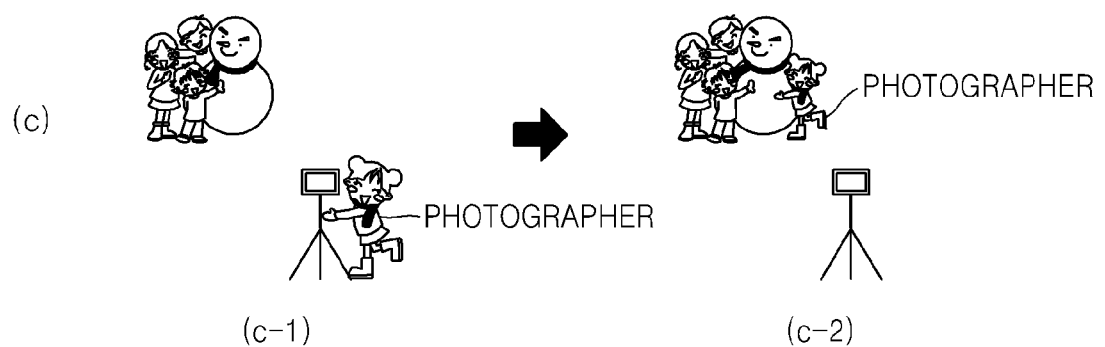

FIGS. 4A-1 and 4B-1 illustrate previous live view images displayed on the display unit 23 after self-timer photographing is initiated. FIGS. 4A-2 and 4B-2 illustrate current live view images displayed on the display unit 23 after a predetermined period of time has elapsed. In a comparison of both cases, i.e. both of FIGS. 4A-1 and 4B-1, and FIGS. 4A-2 and 4B-2, the number of faces has changed. If the number of faces has changed, and positions of faces have not changed during a predetermined period of time, the controller 39-3 controls the current live images to be self-timer photographed.

The operation of the digital signal processing unit 39 will now be described when the number of faces that are to be added is determined and the determined number of faces is detected.

The digital signal processing unit 39 receives the number of faces that are to be added from a user in a self-timer photographing mode, detects the added number of faces from a live view image after the shutter-release button 11 is pressed so as to perform self-timer photographing, detects positions of faces of the live view image with added faces, and, if there no change in the positions of faces during a predetermined period of time, controls to perform the self-timer photographing.

If the self-timer photographing mode is selected, the digital signal processing unit 39 receives a signal for establishing the number of faces that are to be added from a user. For example, the user may establish the signal for establishing the number of faces that are to be added as 1, 2, or more than 2. When the self-timer photographing is performed, the user, as a photographer, or another person may be added to a current composition.

The face recognition unit 39-1 detects the number and position of faces from a live-view image displayed in the display unit 23. The detailed description of the face recognition unit 39-1 was described above and thus it is not repeated.

The face recognition unit 39-1 sends a face number detection result to the controller 39-3 in real-time. The controller 39-3 compares the number of previous faces output by the face recognition unit 39-1 with the number of current faces and determines whether an established number of faces has increased.

The position detection unit 39-2 detects whether positions of the detected faces have changed. If the position detection unit 39-2 receives a signal indicating that the established number of faces has increased from the controller 39-3, the position detecting unit 39-2 determines whether the face position of a current live view image output by the face recognition unit 39-1 has changed during a predetermined period of time (for example, 2-3 seconds), and sends the determination result to the controller 39-3.

If the established number of faces is added to the current live view image, and positions of faces of the changed live view image have not changed during a predetermined period of time, the controller 39-3 controls the live view image to be self-timer photographed.

The timer 39-4 counts self-timer photographing time under the control of the controller 39-3. If the shutter-release button 11 is pressed so as to perform self-timer photographing, the controller 39-3 instructs the timer 39-4 to count the self-timer photographing time. If the established number of faces is additionally detected, the controller 39-3 resets the timer 39-4 with regard to the self-timer photographing time, and outputs a signal for instructing to recount the self-timer photographing time. After the established number of faces has been additionally detected, if a predetermined period of time for detecting the change in the face position exceeds the self-timer photographing time, the controller 39-3 resets the timer 39-4 with regard to the self-timer photographing time, and outputs a signal instructing to recount the self-timer photographing time.

FIGS. 4A-1 and 4B-1 illustrate previous live view images displayed on the display unit 23 after self-timer photographing is established. FIG. 4A-2 illustrates a current live view image including one more face after the user inputs 1 as the number of additional faces, and a predetermined period of time has elapsed. FIG. 4B-2 illustrates a current live view image including two more faces after the user inputs 2 as the number of additional faces, and a predetermined period of time has elapsed. If the established number of faces is added, and there is no change in positions of faces during a predetermined period of time, the controller 39-3 controls the current live images to be self-timer photographed.

The operation of the digital signal processing unit 39 will now be described when information about a photographer is obtained and a photographer's face is detected.

The digital signal processing unit 39 obtains information about the photographer in the self-timer photographing mode, detects the photographer's face from a live view image after the shutter-release button 11 is pressed so as to perform self-timer photographing, detects positions of faces of the changed live view image with the photographer's face added, and, if there is no change in the positions of faces during a predetermined period of time, controls to perform the self-timer photographing.

The digital signal processing unit 39 receives information about the photographer from the photographer. For example, the information about the photographer may be an image of the photographer's face.

The face recognition unit 39-1 detects the number and position of faces from a live-view image displayed in the display unit 23. The detailed description of the face recognition unit 39-1 was described above and thus it is not repeated.

The face recognition unit 39-1 sends a face number detection result to the controller 39-3 in real-time. The controller 39-3 compares the number of previous faces output by the face recognition unit 39-1 with the number of current faces, if there is a change in the number of faces, compares an added face with the obtained information about the photographer, and determines whether the added face is the photographer.

The position detection unit 39-2 detects whether positions of the detected faces have changed. If the position detection unit 39-2 receives a signal indicating that the added face is the photographer from the controller 39-3, the position detecting unit 39-2 determines whether the face position of a current live view image output by the face recognition unit 39-1 has changed during a predetermined period of time (for example, 2-3 seconds), and sends the determination result to the controller 39-3.

If the photographer's face is added to the current live view image, and positions of faces of the changed live view image have not changed during a predetermined period of time, the controller 39-3 controls the live view image to be self-timer photographed.

The timer 39-4 counts self-timer photographing time under the control of the controller 39-3. If the shutter-release button 11 is pressed so as to perform self-timer photographing, the controller 39-3 instructs the timer 39-4 to count the self-timer photographing time. If the photographer's face is additionally detected, the controller 39-3 resets the timer 39-4 with regard to the self-timer photographing time, and outputs a signal instructing to recount the self-timer photographing time. After the photographer's face is additionally detected, if a predetermined period of time for detecting the change in the face position exceeds the self-timer photographing time, the controller 39-3 resets the timer 39-4 with regard to the self-timer photographing time, and outputs a signal instructing to recount the self-timer photographing time.

FIG. 4C-1 illustrates a preparation process for the self-timer photographing performed by the photographer. The information about the photographer is stored in the digital signal processing unit 39. FIG. 4C-2 illustrates a current live view image including the photographer after a predetermined period of time has elapsed. If the photographer's face is added, and there is no change in positions of faces during a predetermined period of time, the controller 39-3 controls the current live image to be self-timer photographed.

Figure 5:
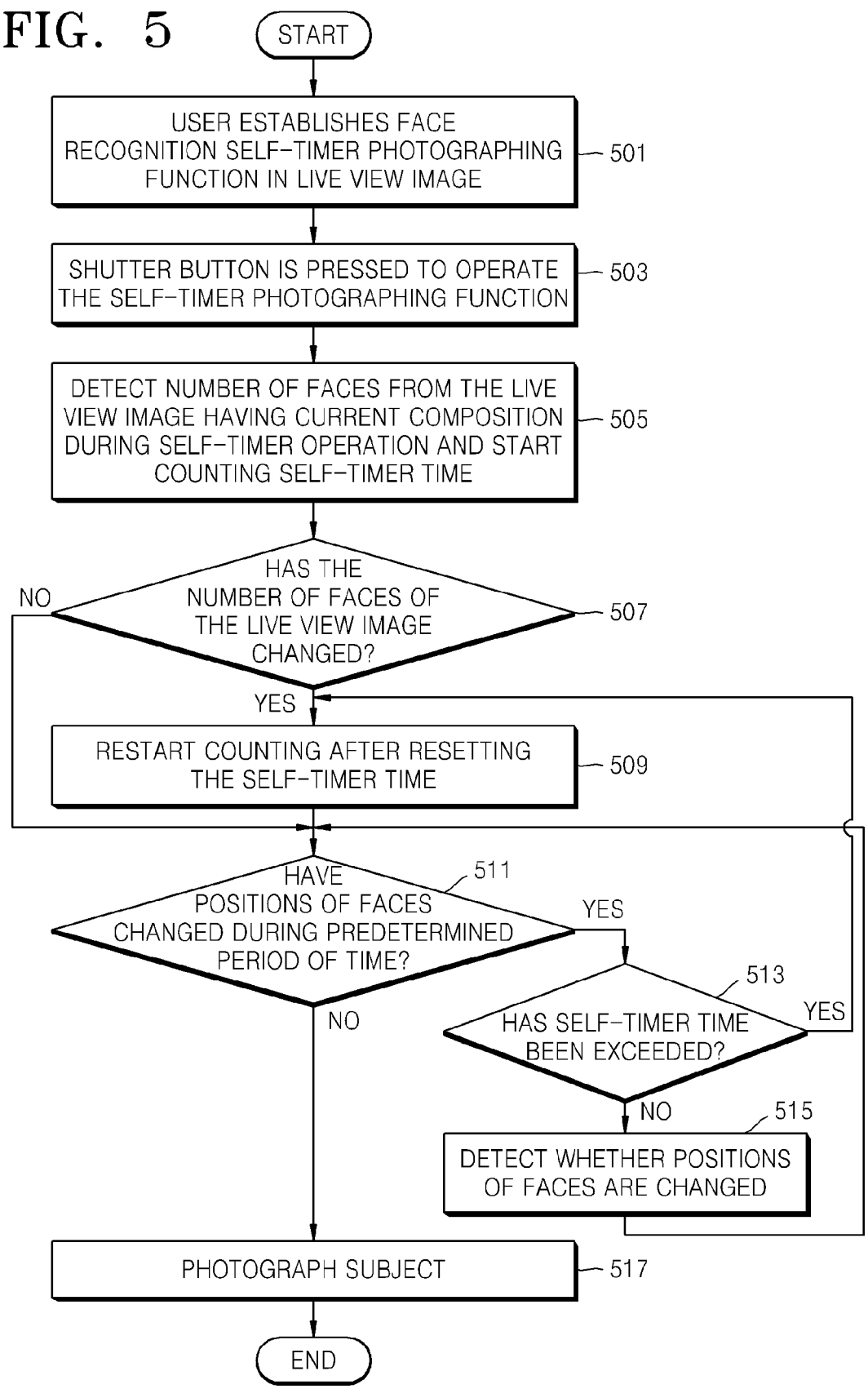
FIG. 5 is a flowchart illustrating a self-timer photographing method involving checking the number of persons according to an embodiment of the present invention.

Hereinafter, a self-timer photographing method involving checking the number of persons will now be in detail described according to an embodiment of the present invention with reference to FIGS. 5 through 7. The self-timer photographing method involving checking the number of persons of the present embodiment may be performed in the digital image processing device shown in FIG. 3. A main algorithm of the self-timer photographing method may be performed in the digital signal processing unit 39 with the aid of peripheral elements of the digital image processing device.

A self-timer photographing method involving checking the number of persons will now be described with reference to FIG. 5 when the number of faces is changed.

If a user establishes a face recognition self-timer photographing function on a live view, the digital signal processing unit 39 changes the digital image processing device to a self-timer photographing mode in operation 501.

The digital signal processing unit 39 receives a shutter-release button 11 input signal for operating the self-timer photographing function in operation 503.

If the shutter-release button 11 is pressed, the digital signal processing unit 39 starts counting self-timer time and simultaneously detects the number and positions of faces from a live view image having a current composition during a self-timer operation in operation 505. The digital signal processing unit 39 searches for characteristics (face elements such as eyes, nose, and mouth, texture, and skin color). In particular, skin color is less sensitive to changes due to movement, rotation, and size of a face and thus it is widely used. The digital signal processing unit 39 stores some standard patterns of a face to detect the face according to a face template based detection method. The digital signal processing unit 39 compares the stored standard patterns with each image within a search window and detects the face. A SVM based face detection method, which has been recently used, sub-samples different areas of an image, makes a face and a non-face learned by using a learning unit, and discovers the face from an input image. Such a face detection method used by the digital signal processing unit 39 is well-known and thus the detailed description thereof is not given here in detail. The digital signal processing unit 39 detects face information such as the number and position of faces by using the face detection method.

The digital signal processing unit 39 determines whether the number of faces of the live view image has changed in operation 507. The digital signal processing unit 39 compares the number of previous faces with the number of current faces and determines whether the number of faces has changed.

If the number of faces of the live view image has changed, the digital signal processing unit 39 resets the self-timer time, and restarts counting the self-timer time in operation 509. If the number of faces is changed, the digital signal processing unit 39 resets the self-timer time, and restarts counting the self-timer time to avoid the situation where a self-timer image having a poor composition is photographed due to relatively late adding of the face.

The digital signal processing unit 39 determines whether positions of the detected faces have changed during a predetermined period of time in operation 511. If there is a change in the number of faces, the digital signal processing unit 39 determines whether positions of faces of the changed current live view image are changed during a predetermined period of time (for example, 2-3 seconds).

If there is a change in the positions of faces of the changed current live view image during the predetermined period of time, the digital signal processing unit 39 determines whether the predetermined period of time for detecting the change in the face position exceeds self-timer photographing time in operation 513, and, if the predetermined period of time for detecting the change in the face position exceeds the self-timer photographing time, the digital signal processing unit 39 resets the self-timer time, and restarts counting the self-timer time.

If the predetermined period of time for detecting the change in the face position does not exceed the self-timer photographing time, the digital signal processing unit 39 detects a change in the positions of faces in operation 515.

If there is no change in the positions of faces during a predetermined period of time, the digital signal processing unit 39 performs the self-timer photographing with regard to a subject in operation 517.

FIGS. 4A-1 and 4B-1 illustrate previous live view images displayed on the display unit 23 after self-timer photographing is established. FIGS. 4A-2 and 4B-2 illustrate current live view images displayed on the display unit 23 after a predetermined period of time is elapsed. In a comparison of both of FIGS. 4A-1 and 4B-1, and FIGS. 4A-2 and 4B-2, the number of faces has changed. If the number of faces has changed, and positions of faces have not changed during a predetermined period of time, the controller 39-3 controls the current live images to be self-timer photographed.

A self-timer photographing method involving checking the number of persons will now be described with reference to FIG. 6 when the number of faces that are to be added is determined and the determined number of faces is detected.

If a user establishes a face recognition self-timer photographing function on a live view, the digital signal processing unit 39 changes the digital image processing device to a self-timer photographing mode in operation 601.

The digital signal processing unit 39 receives a signal for establishing the number of faces that are to be added from a user in operation 603. For example, the digital signal processing unit 39 may establish the signal for establishing the number of faces that are to be added as 1, 2, or more than 2. When the self-timer photographing is performed, the user, as a photographer, or another person may be added to a current composition.

The digital signal processing unit 39 receives a shutter-release button 11 input signal for operating the self-timer photographing function in operation 605.

If the shutter-release button 11 is pressed, the digital signal processing unit 39 starts counting self-timer time and simultaneously detects the number and positions of faces from a live view image having a current composition during a self-timer operation in operation 607. The detection of the number and positions of faces was described above and thus it is not repeated.

The digital signal processing unit 39 determines whether an established number of faces has been added from the live view image in operation 609. The digital signal processing unit 39 stores the established number of additional faces, compares the number of previous faces with the number of current faces, and determines whether the established number of faces has been added.

If the established number of faces is added to the current live view image, the digital signal processing unit 39 resets self-timer time and restarts counting the self-timer time in operation 611. If the number of faces is changed, the digital signal processing unit 39 resets the self-timer time, and restarts counting the self-timer time to avoid the situation where a self-timer image having a poor composition is photographed due to relatively late adding of the established number of faces.

The digital signal processing unit 39 detects whether positions of the detected faces have changed during a predetermined period of time in operation 613. If the established number of faces is added, the digital signal processing unit 39 determines whether the positions of faces of the changed current live view image have changed during a predetermined period of time (for example, 2-3 seconds).

If there is a change in the positions of faces of the changed current live view image during the predetermined period of time, the digital signal processing unit 39 determines whether the predetermined period of time for detecting the change in the face position exceeds self-timer photographing time in operation 615, and, if the predetermined period of time for detecting the change in the face position exceeds the self-timer photographing time, the digital signal processing unit 39 resets the self-timer time, and restarts counting the self-timer time.

If the predetermined period of time for detecting the change in the face position does not exceed the self-timer photographing time, the digital signal processing unit 39 detects a change in the positions of faces in operation 617.

If there is no change in the positions of faces during a predetermined period of time, the digital signal processing unit 39 performs the self-timer photographing with regard to a subject in operation 619.

FIGS. 4A-1 and 4B-1 illustrate previous live view images displayed on the display unit 23 after self-timer photographing is established. FIG. 4A-2 illustrates a current live view image including one more face after the user inputs 1 as the number of additional faces, and a predetermined period of time is elapsed. FIG. 4B-2 illustrates a current live view image including two more faces after the user inputs 2 as the number of additional faces, and a predetermined period of time is elapsed. If the established number of faces is added, and there is no change in positions of faces during a predetermined period of time, the digital signal processing unit 39 controls the current live images to be self-timer photographed.

A self-timer photographing method involving checking the number of persons will now be described with reference to FIG. 7 when information about a photographer is obtained and a photographer's face is detected.

The digital signal processing unit 39 obtains and stores information about the photographer from the photographer in operation 701. For example, the information about the photographer may be an image of the photographer's face.

If a user establishes a face recognition self-timer photographing function on a live view, the digital signal processing unit 39 changes the digital image processing device to a self-timer photographing mode in operation 703.

The digital signal processing unit 39 receives a shutter-release button 11 input signal for operating the self-timer photographing function in operation 705.

If the shutter-release button 11 is pressed, the digital signal processing unit 39 starts counting self-timer time and simultaneously detects the number and positions of faces from a live view image having a current composition during a self-timer operation in operation 707. The detection of the number and positions of faces was described above and thus it is not repeated.

The digital signal processing unit 39 detects whether the photographer's face is added from the live view image having the current composition in operation 709. The digital signal processing unit 39 compares the number of previous faces with the number of current faces, if there is a change in the number of faces, compares an added face with the obtained information about the photographer, and determines whether the added face is the photographer.

If the photographer's face is added to the live view image, the digital image processing unit 39 resets self-timer time, and restarts counting the self-timer time in operation 711. If the number of faces is changed, the digital signal processing unit 39 resets the self-timer time, and restarts counting the self-timer time to avoid the situation where a self-timer image having a poor composition is photographed due to relatively late adding of the photographer's face.

The digital signal processing unit 39 determines whether positions of the detected faces are changed during a predetermined period of time in operation 713. If there is a change in the number of faces, the digital signal processing unit 39 determines whether positions of faces of the changed current live view image have changed during a predetermined period of time (for example, 2-3 seconds).

If there is a change in the positions of faces of the changed current live view image during the predetermined period of time, the digital signal processing unit 39 determines whether the predetermined period of time for detecting the change in the face position exceeds self-timer photographing time in operation 715, and, if the predetermined period of time for detecting the change in the face position exceeds the self-timer photographing time, the digital signal processing unit 39 resets the self-timer time, and restarts counting the self-timer time.

If the predetermined period of time for detecting the change in the face position does not exceed the self-timer photographing time, the digital signal processing unit 39 detects a change in the positions of faces in operation 717.

If there is no change in the positions of faces during a predetermined period of time, the digital signal processing unit 39 performs the self-timer photographing with regard to a subject in operation 719.

FIG. 4C-1 illustrates a preparation process for the self-timer photographing performed by the photographer. The information about the photographer is stored in the digital signal processing unit 39. FIG. 4C-2 illustrates a current live view image including the photographer after a predetermined period of time is elapsed. If the photographer's face is added, and there is no change in positions of faces during a predetermined period of time, the digital signal processing unit 39 controls the current live image to be self-timer photographed.

According to the present invention, when an image including an additional person is photographed by using a self-timer function, a digital image processing device recognizes a face and photographs the image in a stable state until a self-timer operation is completely performed, thereby increasing the probability of success for photographing the image.

While the present invention has been particularly shown and described with reference to embodiments thereof, it will be understood by one of ordinary skill in the art that various changes in form and detail may be made therein without departing from the spirit and scope of the present invention as defined by the following claims.

What is claimed is:

1. A self-timer photographing apparatus for checking a number of persons with a digital image processing device, the apparatus comprising:
   a digital signal processing unit that:
      starts counting self-timer time and simultaneously detects a number of faces from a live view image if a shutter-release button is pressed,
      detects a change in the number of faces of the live view image,
   resets a self-timer photographing time and restarts counting the self-timer photographing time if a change in the number of faces is detected,
      detects positions of faces of the live view image, and
      when there is no change in the positions of faces during a predetermined period of time, controls to perform self-timer photographing, and when there is change in the positions of faces during a predetermined period of time, controls not to perform self-timer photographing.

2. The apparatus of claim 1, wherein the digital signal processing unit resets a self-timer photographing time and restarts counting the self-timer photographing time if a change in the number of faces is detected.

3. The apparatus of claim 1, wherein the digital signal processing unit comprises:
   a face recognition unit that detects the number and positions of faces from the live view image in a self-timer photographing mode;
   a position detecting unit that detects a change in the detected positions of faces; and
   a controller that, if the number of faces of the live view image has changed, and the positions of faces of the changed live view image have not changed during a predetermined period of time, controls the live view image to be self-timer photographed.

4. A self-timer photographing method involving checking a number of persons, the method comprising steps of:
   starting counting self-timer time and simultaneously detecting a number of faces from a live view image if a shutter release button is pressed;
   detecting a change in the number of faces of the live view image;
   resetting a self-timer photographing time and restarting counting the self-timer photographing time if a change in the number of faces is detected;
   detecting whether there is a change in positions of faces in the live view image in which there has been a change in the number of faces during a predetermined period of time; and
   when there is no change in the positions of faces during the predetermined period of time, controlling to perform self-timer photographing, and when there is change in the positions of faces during a predetermined period of time, controlling not to perform self-timer photographing.

5. The method of claim 4, wherein the detecting of the change in the number of faces comprises, if a change in the number of faces is detected, resetting self-timer photographing time and restarting counting the self-timer photographing time.

6. The method of claim 4, wherein the controlling of the performing of self-timer photographing comprises after the change in the number of faces is detected, if the predetermined period of time for detecting the change in the number of faces exceeds the self-timer photographing time, resetting the self-timer photographing time and restarting counting the self-timer photographing time.

* * * * *